Figure 1:
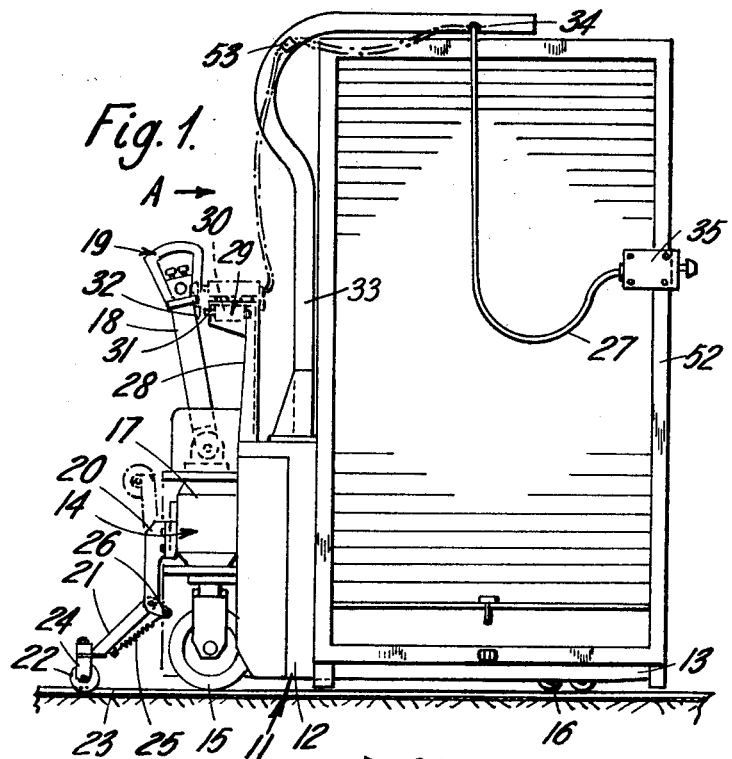

June 15, 1965

J. R. V. DOLPHIN ETAL 3,188,978

INDUSTRIAL TRUCKS

Filed Feb. 12, 1963

3 Sheets-Sheet 1

INVENTORS
John R. V. Dolphin
Ivor J. C. Kent

By Fish, Richardson & Neave
ATTORNEYS

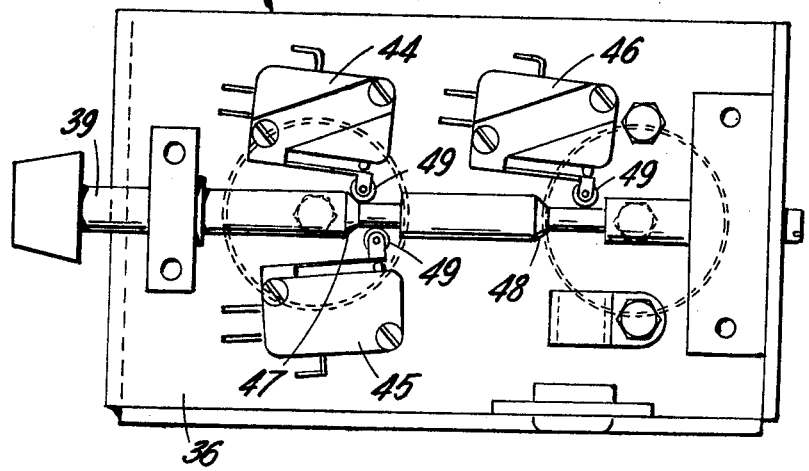
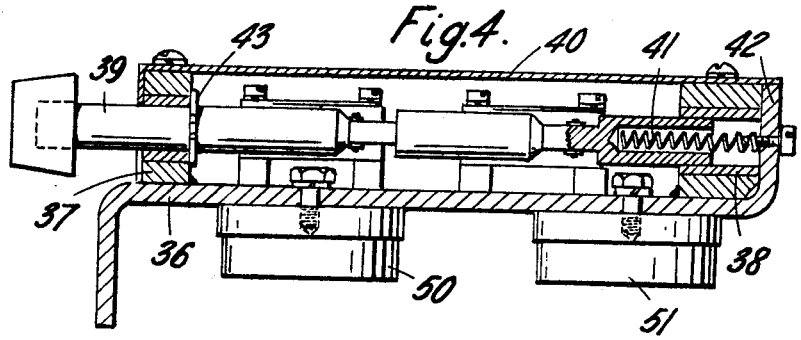

June 15, 1965   J. R. V. DOLPHIN ETAL   3,188,978
INDUSTRIAL TRUCKS
Filed Feb. 12, 1963   3 Sheets-Sheet 3

United States Patent Office 3,188,978
Patented June 15, 1965

3,188,978
INDUSTRIAL TRUCKS
John Robert Vernon Dolphin and Ivor James Charles Kent, Basingstoke, England, assignors to Lansing Bagnall Limited, Basingstoke, Hampshire, England, a British company
Filed Feb. 12, 1963, Ser. No. 257,943
3 Claims. (Cl. 104—247)

This invention comprises improvements in or relating to industrial trucks.

According to the invention there is provided an industrial truck comprising a chassis, a sub-chassis mounted on one end of the chassis for steering movements, a ground wheel on the sub-chassis to effect the steering, a motor on the sub-chassis, drive connections from the motor to the ground wheel, and an arm having a part for engaging a guide rail, the arm being pivoted on the sub-chassis to swing downwardly for bringing said parts into engagement with the rails and upwardly away from the rail, the arrangement being such that lateral movements of said parts are transmitted through the arm to produce steering movements of the ground wheel.

In one arrangement the said part comprises a guide wheel mounted for rotation about a horizontal axis on the arm. In one form of this arrangement the arm comprises a portion which partakes of steering movements of the ground-engaging wheel, and a bracket mounted on the end of said portion remote from the sub-chassis for rotation about an upright axis relative to said portion, the guide wheel being mounted on said bracket. The arm may conveniently be resiliently urged into its uppermost position when in its uppermost position and is resiliently urged downwardly into engagement with the rail when in engagement with the rail.

The motor may be an electric motor and switch means for controlling the motor may be provided on a flexible connection. The flexible connection may also carry switch means for operating a solenoid mechanism which is operatively linked to a mechanical brake for braking the ground wheel. The brake may be urged into its operative position by resilient means in which case the solenoid acts to release the brake against the action of the resilient means.

In one construction, the switch means for controlling the motor and the switch means for operating the solenoid mechanism are mounted in a housing and are operated by a spring loaded plunger slidable in the housing and having cam surfaces for operating the switch means in sequence. In one form of this construction, initial movement of the plunger operates the switch means for the solenoid mechanism to release the brake, further movement of the plunger operates first switch means to complete the motor circuit, and still further movement of the plunger operates second switch means to short-circuit a resistance in the motor circuit to increase the speed of the motor.

A further set of controls for controlling the motor and the brake may conveniently be mounted on the sub-chassis.

Figure 2:
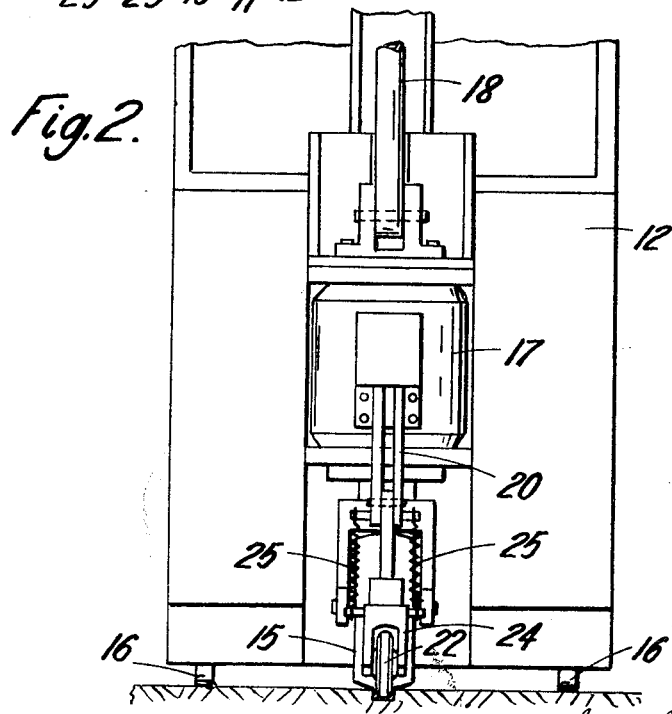
Figure 5:
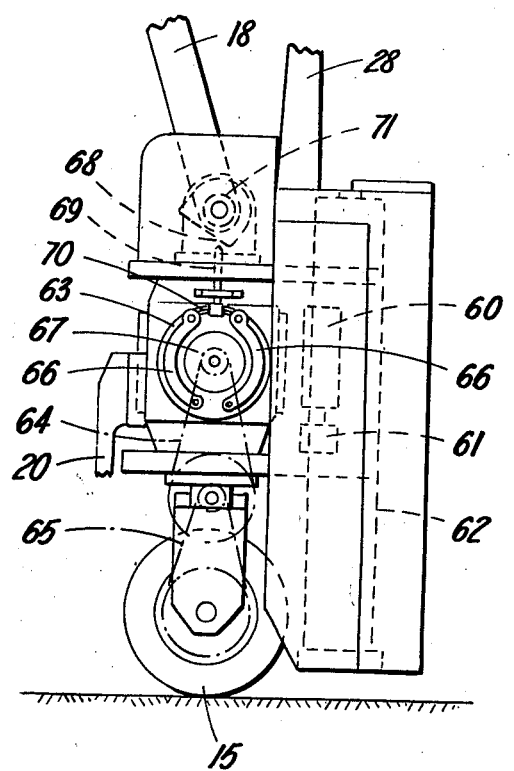

One construction of an industrial truck in accordance with the invention will now be described, by way of example, and with reference to the accompanying drawings in which:

FIGURE 1 is a side elevation of the truck;
FIGURE 2 is a fragmentary end view of FIGURE 1 in the direction of arrow A;
FIGURE 3 is a plan view of a detail of FIGURE 1 with some parts removed and is to larger scale than FIGURE 1,
FIGURE 4 is a sectional elevation of the detail shown in FIGURE 3, and
FIGURE 5 is a partly sectioned side elevation of a fragment of the truck;

Referring to FIGURES 1 and 2, the truck comprises a chassis 11, which has a body portion 12 and a pair of load carrying forks 13 (only one of which is shown) projecting horizontally from the body portion, and a sub-chassis 14 mounted on the end of the body portion remote from the forks 13 for steering movements. A ground wheel 15 is mounted on the sub-chassis to effect steering and each fork 13 carries a pair of ground rollers 16 at its end remote from the body.

A hydraulic system comprising an electric motor 60, a pump 61 and a hydraulic jack 62 is provided in the chassis to lift and lower the chassis on the sub-chassis 14 and on the rollers 16.

An electric driving motor 63 having a circuit for regenerative braking (which may be rheostatically controlled) and housed in a casing 17 is mounted on the sub-chassis above the ground wheel 15 and the ground wheel is driven by the motor through roller chains 64, 65. A mechanical brake is provided comprising two shoes 66 operating on a drum 67 fixed to the motor shaft and a control arm 18 is provided for operating the brake. The arm 18 is pivoted to the sub-chassis for movement in a vertical plane and carries a cam 68 which operates a push rod 69 connected through links 70 to the brake shoes. The arm 18 can be swung through approximately a right-angle from an upright to a horizontal position and the cam is so shaped that the brake shoes engage the drum when the arm 18 is either upright or horizontal, but leave the drum free to rotate when the control arm is in an intermediate position. Resilient means 71 are provided to urge the control arm into its upright position so that the brake is rendered operative when the truck is not being used.

The control arm 18 carries controls 19 for the driving motor and for the hydraulic system and also provides a means for rotating the sub-chassis, together with the wheel 15, with respect to the chassis to control the direction of movement of the truck.

Mounted on the motor casing 17 is a bracket 20 which extends downwardly and has an arm 21 pivoted to its lower end for swinging about a horizontal axis. At its end remote from the pivot, the arm 21 carries a guide wheel 22 rotatable about a horizontal axis and the arm 21 can be swung downwardly to bring the wheel 22 into engagement with a channel-shaped guide rail 23 and upwardly away from the rails. The wheel 22 is mounted between the forks of a forked bracket 24 which is pivoted to the arm 21 so that when the wheel 22 is in engagement with the guide rail the forked bracket is pivotable about an upright axis.

Associated with the arm 21 are resilient means in the form of a pair of helical springs 25 which urge the arm into its uppermost position when in its uppermost position (as shown in chain lines in FIGURE 1) and urge it downwardly to maintain the wheel 22 in engagement with the rail 23 when the wheel is in engagement with the rail. The springs 25 extend between a lug 26 on the bracket 20 and the end of the arm 21 remote from the pivot between the arm 21 and the bracket 20. The lug 26 projects from the pivot between the arm 21 and the bracket 20 towards the ground wheel 15 so that the springs act in the manner described.

The arrangement is such that when the guide wheel is in engagement with the guide rail, lateral movements of the guide wheel are transmitted through the arm 21 to produce steering movements of the ground wheel.

Switch means for controlling the driving motor and the brake are also provided on a flexible connection 27 so that when the guide wheel 22 is in engagement with the guide rail an operator can control the truck from a position remote from the control handle 18.

Mounted on the sub-chassis between the control handle 18 and the chassis is an upright column 28 having at its upper end a solenoid mechanism 29 comprising a solenoid 30 surrounding a slidable plunger 31. When the solenoid is energized the plunger 31 slides with respect to the column towards the control handle 18. The control handle has a flat abutment 32 which engages the end of the plunger 31 facing the control handle when the control handle is in its upright position and the sliding of the plunger when the solenoid is energized moves the handle 18 away from its upright position thereby to release the brake. Energising of the solenoid is controlled by a switch 44 which is on the flexible connection 27 and will be again referred to hereinbelow.

Mounted on the body 12 of the chassis is a tubular member 33 having an upright straight portion projecting upwardly from the body, a horizontal straight portion projecting over the forks 13, and an arcuate intermediate portion between the two straight portions. At the end of the horizontal portion remote from the body 12, an aperture 34 is provided in the wall of the tubular member and the flexible connection extends through this hole into the tubular member and to control gear of the driving motor and the solenoid.

At its free end, the connection 27 is attached to a housing 35 in which are mounted two micro-switches for controlling the driving motor and one micro-switch for controlling the solenoid. Leads from the connection are connected to these micro-switches.

Referring to FIGURES 3 and 4, the housing comprises a rectangular base plate 36 on opposite ends of which are mounted two bushes 37, 38 for receiving a plunger 39 slidable in the bushes and a removable cover 40 having side walls and end walls. At its end which slides in the bush 38, the plunger is bored out and a helical spring 41 is disposed in the bore to extend between the base of the bore and a flange 42 on the base plate and to urge the plunger towards the push 37. A stop 43 is provided on the plunger to limit movement of the plunger under the action of the spring and movement of the plunger in the opposite direction is limited by the bored end of the plunger engaging the flange 42.

Mounted on the base plate between the bushes 37, 38 are three micro-switches 44, 45, 46. The switch 44 is for controlling the solenoid and the switches 45, 46 are for controlling the driving motor. Between the bushes 37, 38 the plunger has cam surfaces 47, 48 which co-operate with rollers 49 on the switches for operating the switches in sequence when the plunger is moved. The rollers are resiliently urged against the plunger. The sequence is such that when the plunger is moved against the action of the spring, the cam surface 47 first operates the switch 44 to energize the solenoid and thereby release the brake and thereon further movement of the plunger, operates the switch 45 to complete the driving motor circuit and thereby cause the trucks to move. On further movement still against the action of the spring 41, the cam surface 48 operates the switch 46 thereby to short-circuit a rheostat in the driving motor circuit and cause the truck to move at a faster speed. When the plunger is released, it moves under the action of the spring 41 and the switches are opened in sequence, switch 46 being opened first, then switch 45 and finally switch 44.

Two permanent magnets 50, 51 are mounted on the base plate 36 on its side remote from the switches and plunger, and by means of these magnets the housing 35 can be conveniently held on a pallet or the like which has parts of magnetic material and is being carried on the truck. In FIGURE 1, the truck is shown carrying a stillage 52 and the housing 35 is held on an upright of the stillage at the end of the truck remote from the handle 18. If a pallet or the like being carried on the truck has no parts of magnetic material, the housing is held by the operator.

When the truck is being controlled by the handle 18, the housing can be stowed on the top of the column 28 and the flexible connection can be hooked over a hook 53 on the arcuate portion of the tubular member 33.

Such a truck is extremely useful for order picking from narrow aisles. Each aisle is provided with a guide rail in its centre extending along its length. The truck (with the arm 21 in its uppermost position) picks up a pallet and is driven by means of the control arm 18 to one end of an aisle. Here the arm 21 is lowered to bring the wheel 22 into engagement with the rail and an operator then controls progress down the aisle by means of the plunger 39 in the housing 35 on the flexible connection 27, the guide wheel 22 in the rail serving to steer the truck. The operator can thus remain behind the truck where he can conveniently load the pallet. At the end of the aisle the arm 21 is raised and the control arm 18 is used to guide the truck to the next aisle or to deposit the completed order.

In this way order picking can be effected very quickly, and the aisles can be made very narrow because the operator does not have to pass from the front to the back of the truck whilst in the aisle. Thus such a truck enables storage space to be used more efficiently.

When the wheel 22 is in engagement with the guide rail, the truck is propelled so that the wheel 22 precedes the ground wheel 15 to ensure that proper guidance of the truck is obtained. A control may be provided on the handle 18, however, to enable the truck to move in the opposite direction but the truck will normally only be so moved when an operator is controlling the truck by means of the handle 18.

We claim:
1. An industrial truck comprising
  (a) a truck chassis,
  (b) a turntable-mounting at one end of the truck chassis,
  (c) a sub-chassis mounted on the turntable-mounting for steering movements, which sub-chassis comprises a ground wheel, a brake therefor and driving means therefor,
  (d) a hand control arm pivoted on the sub-chassis for up-and-down movement relatively thereto but so that it is restrained by its pivotal connection against lateral movement relatively to the sub-chassis,
  (e) link means linking the hand-control arm and the brake, through which link means up-and-down movements of the control arm are transmitted to operate the brake, and
  (f) means yieldingly urging the hand-control arm into a position in which it renders the brake operative, in combination with
  (g) a steering arm pivoted on the sub-chassis for up-and-down movement relatively thereto but so that it is restrained by its pivotal connection from lateral movements relatively to the sub-chassis, the steering arm normally projecting from the sub-chassis in a direction away from the truck chassis,
  (h) a guide-rail-engaging element on the free end of the steering arm,
  (i) means for yieldingly urging the steering arm downward thereby yieldingly to urge said guide rail-engaging element to engage the guide-rail,
  (j) a solenoid-and-plunger on a part fixed relatively to the sub-chassis, the solenoid-and-plunger being arranged for the plunger to move the hand-control arm out of said position in which it renders the brake operative when the solenoid is energized thereby to release the brake, and
  (k) control means for operating the solenoid-and-plunger and for controlling motion of the truck, which control means are operable from the opposite end of the truck to that at which the sub-chassis is located.

2. An industrial truck as claimed in claim 1 wherein the driving means comprise an electric motor and the control means comprise switch devices which are housed in a control box connected to the truck by a flexible electric cable and which are operated by a spring-loaded plunger slidable in the control box and having cam surfaces for operating the switch devices in sequence.

3. An industrial truck as claimed in claim 2 wherein initial movement of the spring-loaded plunger operates a switch device for the solenoid-and-plunger thereby to energize the solenoid and cause the brake to be released, further movement of the spring-loaded plunger operates a switch device to complete the control circuit of the electric motor and still further movement of the spring-loaded plunger operates a switch device to short-circuit a resistance in the control circuit of the motor thereby to increase the speed of the motor.

References Cited by the Examiner
UNITED STATES PATENTS

| | | | |
|---|---|---|---|
| 978,953 | 12/10 | Stanley | 191—89 X |
| 2,320,196 | 5/43 | Roe. | |
| 2,325,396 | 7/43 | Hastings | 180—13 |
| 2,592,091 | 4/52 | Weaver | 180—13 |
| 2,944,491 | 7/60 | LeFiell | 104—103 |
| 2,972,966 | 2/61 | Bourdon | 104—247 |

MILTON BUCHLER, *Primary Examiner.*

LEO QUACKENBUSH, *Examiner.*